United States Patent
Dague et al.

(10) Patent No.: US 6,426,847 B1
(45) Date of Patent: Jul. 30, 2002

(54) OVER-MOLDED BASE PLATE AND METHOD OF MANUFACTURE OF OVER-MOLDED BASE PLATE FOR A DISC DRIVE

(75) Inventors: Wallis Allen Dague, Louisville; Frederick Mark Stefansky, Longmont, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/487,235

(22) Filed: Jan. 19, 2000

Related U.S. Application Data
(60) Provisional application No. 60/130,281, filed on Apr. 21, 1999.

(51) Int. Cl.[7] .............................................. G11B 17/00
(52) U.S. Cl. ................................................... 360/97.01
(58) Field of Search .......................... 360/97.01, 97.02, 360/97.03, 97.04; 29/603.03, 402.18

(56) References Cited

U.S. PATENT DOCUMENTS

| | | | |
|---|---|---|---|
| 4,075,395 A | 2/1978 | Ohnishi ...................... 428/542 |
| 4,202,091 A | 5/1980 | Ohnishi ...................... 29/527.1 |
| 4,688,328 A | 8/1987 | Jebens et al. .................. 29/839 |
| 4,813,194 A | 3/1989 | Dobyns et al. ............ 52/309.13 |
| 5,079,655 A * | 1/1992 | Yagi ........................... 360/97.02 |
| 5,134,608 A * | 7/1992 | Strickler et al. ............ 360/265.1 |
| 5,329,412 A * | 7/1994 | Stefansky ................. 360/97.01 |
| 5,400,198 A | 3/1995 | Suzuki et al. ............. 360/99.06 |
| 5,414,574 A | 5/1995 | Boutaghou et al. ....... 360/97.01 |
| 5,546,250 A * | 8/1996 | Diel ........................... 360/97.02 |
| 5,581,422 A * | 12/1996 | Umehara ................... 360/97.01 |
| 5,633,768 A | 5/1997 | Watanabe ................. 360/99.01 |
| 5,650,896 A | 7/1997 | Viskochil ..................... 360/106 |
| 5,657,182 A * | 8/1997 | Kuwamoto et al. ....... 360/97.01 |
| 5,673,158 A * | 9/1997 | Ichimura ................... 360/97.01 |
| 5,739,985 A * | 4/1998 | Kim ........................... 360/281.3 |
| 6,023,392 A * | 2/2000 | Kim ........................... 29/603.03 |
| 6,034,841 A * | 3/2000 | Albrecht et al. .......... 360/97.01 |
| 6,178,061 B1 * | 1/2001 | Obara ....................... 360/97.01 |
| 6,278,574 B1 * | 8/2001 | Wakita et al. ............ 360/99.01 |

* cited by examiner

*Primary Examiner*—David Hudspeth
*Assistant Examiner*—Angel Castro
(74) *Attorney, Agent, or Firm*—John B. Phillips; Merchant & Gould P.C.

(57) ABSTRACT

An apparatus and method of manufacturing a low cost disc drive base plate that incorporates a platform portion and one or more over-molded disc drive structural components. The platform portion of the base plate is stamped or fine blanked from sheet metal and defines a centrally located depression for receiving over-molded structural components of the disc drive. The structural components of the disc drive are over-molded using a polymer or plastic insert molding process to the platform portion of the base plate. The use of a stamped platform portion having over-molded structural components significantly reduces conventional manufacturing costs and allows for the design of a disc drive having greater positional accuracy then that obtained with current disc drive technology.

5 Claims, 5 Drawing Sheets

OVER-MOLDED BASE PLATE AND METHOD OF MANUFACTURE OF OVER-MOLDED BASE PLATE FOR A DISC DRIVE

RELATED APPLICATIONS

This application claims the benefit of priority of U.S. Provisional Patent Application Serial No. 601130,281 entitled "LOW COST OVER-MOLDED BASE PLATE FOR HARD DISC DRIVES," filed Apr. 21, 1999.

FIELD OF THE INVENTION

This application relates to magnetic disc drives and more particularly to low cost base plates having over-molded structural components and to a method for forming low cost base plates having over-molded structural components.

BACKGROUND OF THE INVENTION

Disc drives are data storage devices that store digital data in magnetic form on a rotating storage medium on a disc. Disc drives have an outer framework that includes a base plate and top cover. The base plate is essentially a platform to which disc drive components are secured and is of a size and shape to mount the disc drive to the chassis of the computer. The top cover of the disc drive cooperates with the base plate to form an internal sealed compartment for housing other components of the disc drive.

Typically, the base plate is composed of aluminum or steel and is formed through either a metal die-casting or extrusion process. Die-casting the base plate is well-known in the disc drive art, involving the addition of molten aluminum or steel, forced under pressure, into a mold conforming to the appropriate size and shape of a disc drive base plate. Once formed, the plate undergoes post machining operations to reach required industry size tolerances. The base plate is then e-coated to remove silicon-based agents used in the die casting process and seal the porous die cast metal. Finally, numerous pre-fabricated and inventoried components of the disc drive are installed onto the base plate. These components include but are not limited to the filter bracket, crash-stops, latching devices, mounting bosses, sound attenuation devices and shock protection features.

Forming a base plate by extrusion entails that the aluminum or steel substrate be extruded through a base plate shaped die. Extrusion, like die-casting, requires costly post machining operations to bring the base plate within industry sizing tolerances, and also requires the installation of the pre-fabricated inventoried components to the base plate. Extrusion, however, unlike die-casting, does not require the e-coating step and is, therefore, typically considered the preferred method for forming the base plate.

The die-casting and extrusion techniques for forming the base plate require that pre-fabricated disc drive components be installed onto the machined base plate. The components are manufactured separately from each other and are assembled onto the base plate using various forms of fastening techniques, such by screws, nuts, clips or press fits. The process of installing the pre-fabricated components onto the base plate is costly and time consuming for the following reasons: (1) each pre-fabricated component part, feature or assembly requires its own manufacturing cost attributed to materials, labor, energy and shipping resources; (2) each pre-fabricated component incorporates tightly toleranced location features for locating the component to the base plate, where the location features are designed for and maintained through costly quality control programs; (3) each individual pre-fabricated component is inventoried, tracked, inspected and stored for the base plate manufacturing process; (4) each fastening technique used to fasten a pre-fabricated component to the base plate has its own cost attributed to material and labor; and (5) each fastening technique requires that pre-fabricated components be secured to the base plate in an ordered fashion, i.e., require costly "balanced manufacturing lines" that incorporate additional work stations and workers.

Accordingly, a need exists in the art to minimize expenses of, and time lost during, the manufacture of conventional disc drive base plates.

SUMMARY OF THE INVENTION

Against this backdrop the present invention has been developed. The present invention is a low cost disc drive base plate having a platform portion and at least one structural component of the disc drive over-molded to the platform portion.

In accordance with one embodiment of the present invention, the low cost base plate for the disc drive includes a platform portion having a top surface and bottom surface. A disc drive structural component is over-molded onto the platform portion to secure the structural component to the platform portion.

The present invention may also be implemented as a base plate including the platform portion with two or more over-molded structural components. The structural components may be over-molded to either the top or bottom surface of the platform portion.

The present invention can further be implemented as a method for manufacturing a low cost base plate for use in a disc drive. The method typically has the steps of forming a platform portion of the base plate and then over-molding a preferably plastic disc drive structural component to the platform portion so as to fasten the structural component to the platform portion.

These and various other features as well as advantages which characterize the present invention will be apparent from a reading of the following detailed description and a review of the associated drawings.

DETAILED DESCRIPTION

Figure 1:
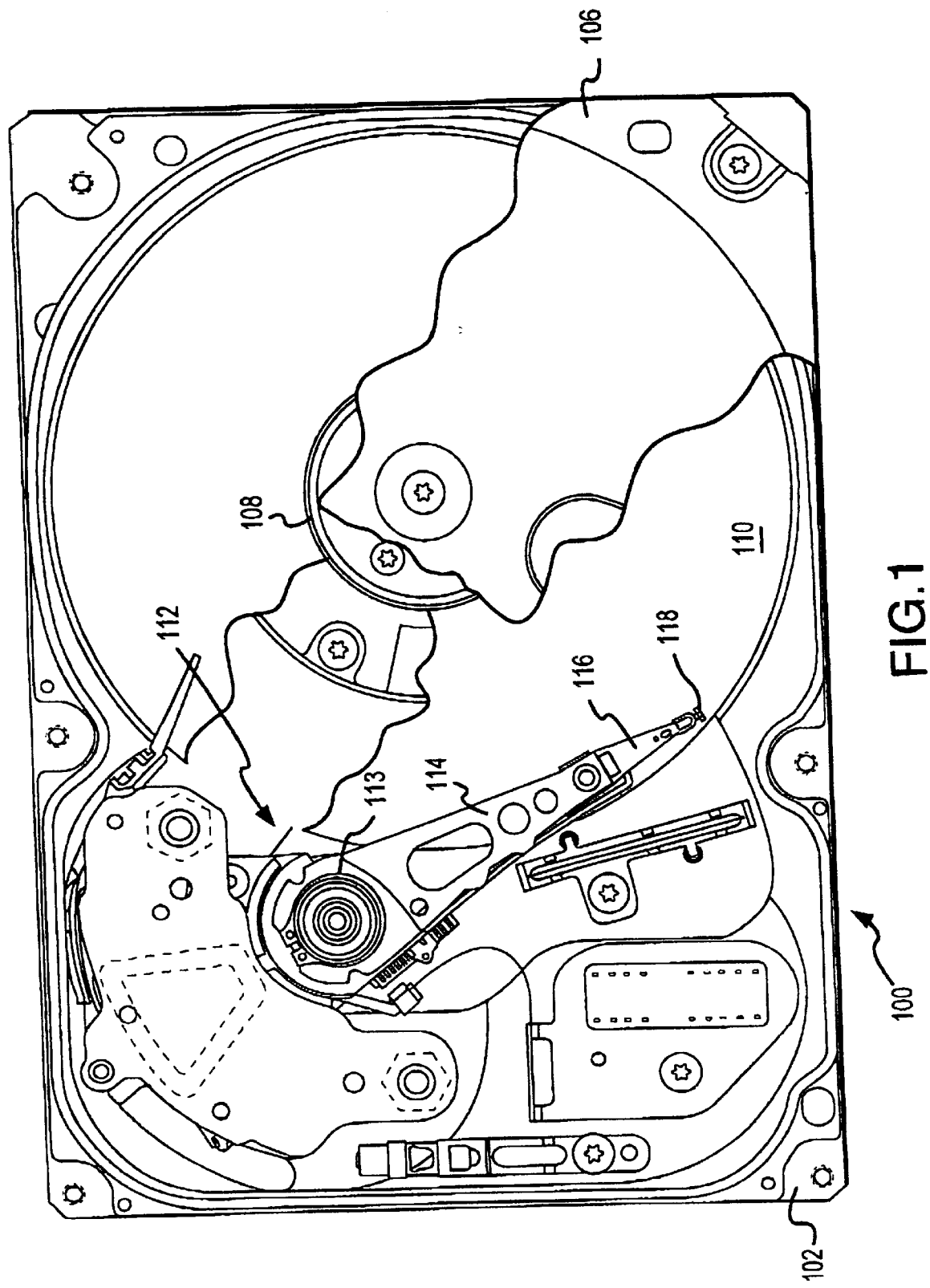
FIG. 1 is a plan view of a disc drive incorporating a low cost base plate in accordance with a preferred embodiment of the present invention.

A disc drive 100 constructed in accordance with a preferred embodiment of the present invention is shown in FIG. 1. The disc drive 100 includes a base plate 102 to which various structural components 104 and 105 (FIGS. 3 and 4) of the disc drive 100 are mounted. A top cover 106, shown partially cut away, cooperates with the base plate 102 to form an internal, sealed environment for the components of the described below disc drive 100.

Enclosed within the disc drive 100, shown in FIG. 1, is a spin drive motor 108 which rotates one or more information storage discs 110 at a constant high speed. Information is written to and read from tracks on the information storage discs 110 through the use of an actuator assembly 112, which rotates about a bearing shaft assembly 113 positioned adjacent the discs 110. The actuator assembly 112 includes a plurality of actuator arms 114 which rotate over the surfaces of the information storage discs 110, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

Figure 2:
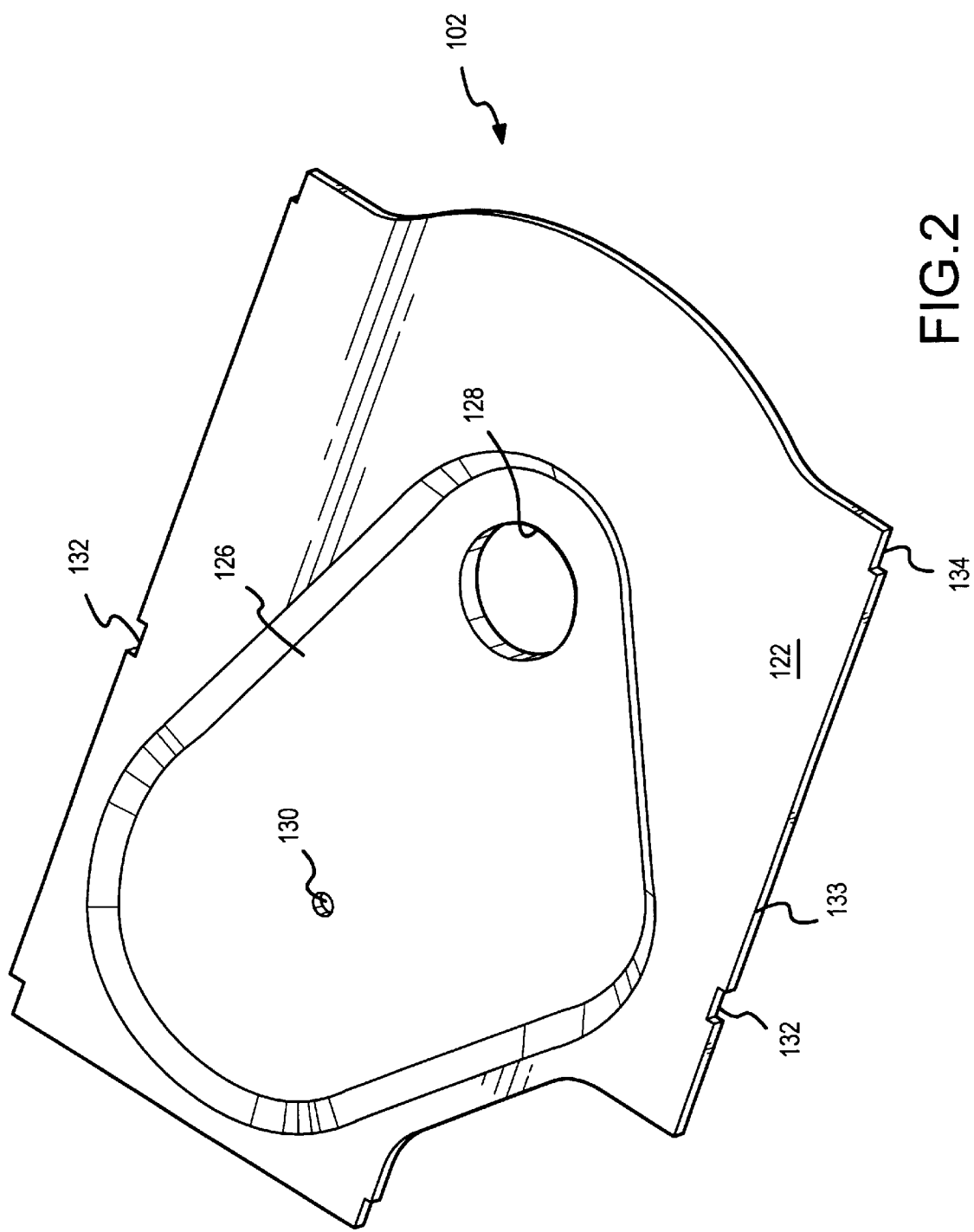
FIG. 2 illustrates a perspective separate view of a platform portion of the present invention.
Figure 4:
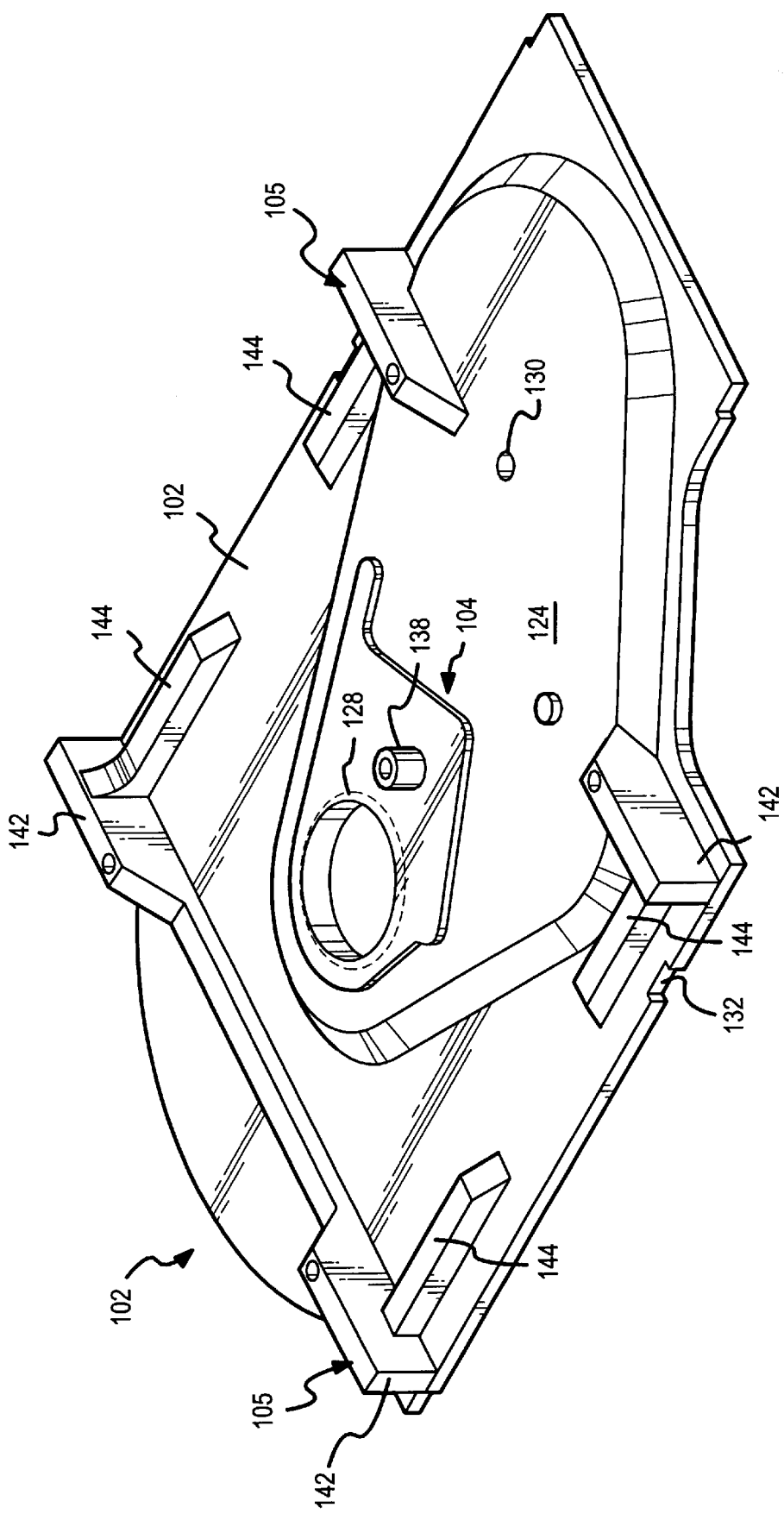
FIG. 4 illustrates a perspective separate view of a bottom surface of the platform portion incorporating over-molded structural components of the disc drive.

A platform portion 120 of the base plate 102 of the preferred embodiment of the present invention is shown in FIG. 2. The base plate 102 has a platform portion 120 that includes a top surface 122 and bottom surface 124 (FIG. 4). The platform portion 120 is generally of rectangular shape and is preferably formed by a method such as stamping or fine blanking. The platform portion 120 is preferably formed from metal or other like material. The platform portion 120 generally acts as a structural foundation for the over-molded structural components 104 and 105 of the base plate 102.

Figure 3:
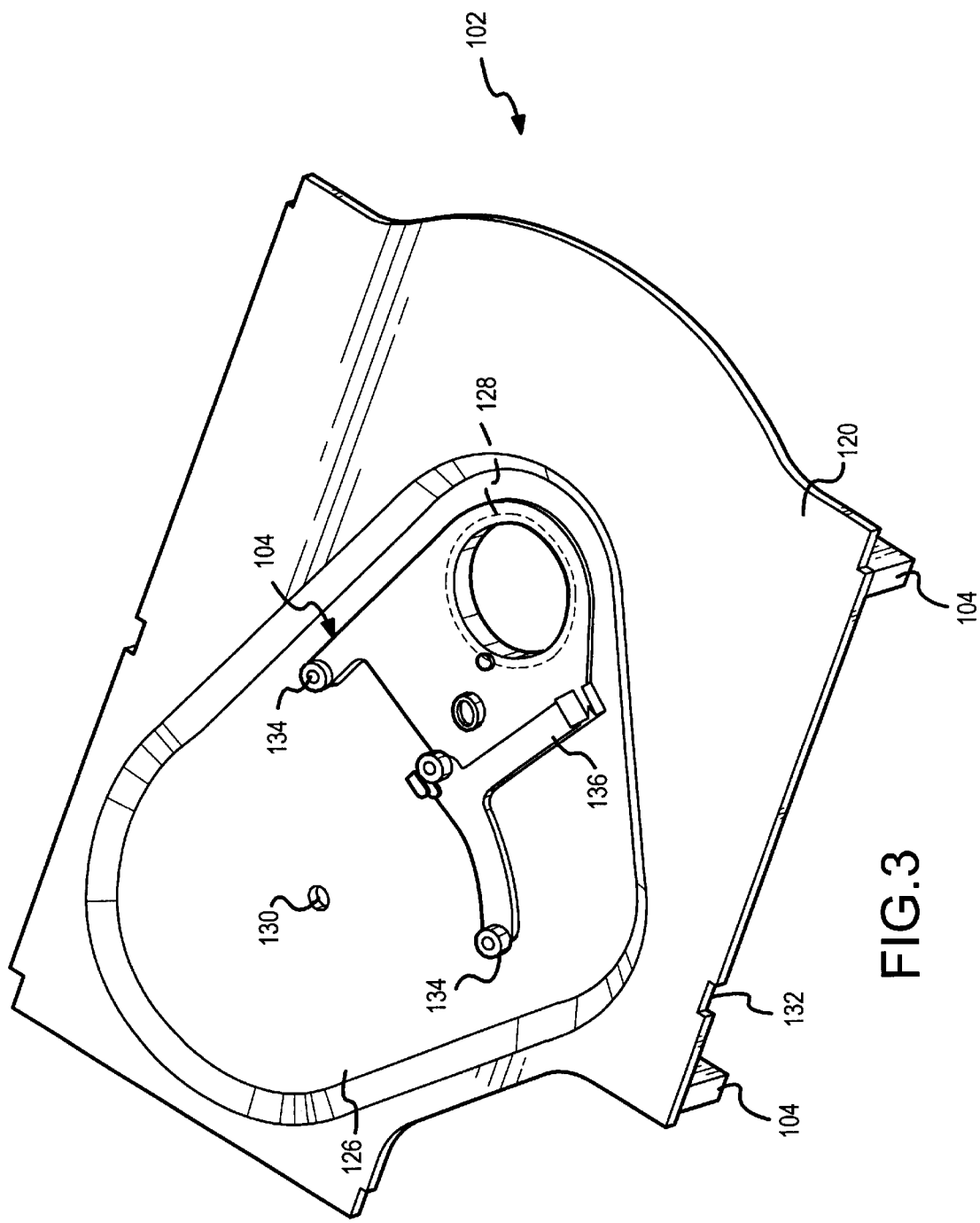
FIG. 3 illustrates a perspective separate view of a top surface of the platform portion shown in FIG. 2 incorporating over-molded structural components of the disc drive.

A centrally defined depression 126 in the platform portion 120 of the base plate 102 accommodates one or more over-molded structural components 104 and 105 as is shown in FIGS. 3 and 4. An aperture 128 for mounting the spin motor 108 (FIG. 1) and an aperture 130 for mounting the actuator assembly 112 (FIG. 1) are defined within the centrally located depression 126 of the platform portion 120. Notches 132 along the edges 133 of the platform portion 120 act as mounting features between the platform portion 120 of the base plate 102 and the top cover (not shown).

Several structural components 104 and 105 in accordance with a preferred embodiment of the present invention are over-molded to the platform portion 120 of the base plate 102, as shown in FIGS. 3 and 4. The over-molded structural component 104 is around, over and through the aperture 128 and extends over both the top and bottom surfaces 122 and 124 respectively of the platform portion 120. The structural component 104 forms a crash-stop 134 and a ramp loading device 136 on the top surface 122 of the platform portion 120 (FIG. 3) and a mounting boss 138 on the bottom surface 124 of the platform portion (FIG. 4).

FIG. 4 shows several additional disc drive structural components 105 that have been over-molded to the bottom surface 124 of the platform portion 120 of the base plate 102. These structural components 105 include mounting rails 142 for mounting the base plate 102 to the computer chassis (not shown) and spaced support rails 144 for mounting the PC board (not shown) to the bottom of the base plate 102. The mounting boss 138 receives a screw (not shown) to fasten the PC board in place.

Over-molding the disc drive structural components 104 and 105 to the platform portion 120 is preferably accomplished utilizing a polymer insert molding process, although other over-molding processes are understood to be within the scope of the present invention. Polymer insert molding provides a consistent mechanism accurately positioning the structural component on the platform portion of the base plate. One preferred type of polymer for use in the insert molding process is a thermo-set plastic.

The structural components 104 and 105 that can be over-molded to the platform portion 120 of the base plate 102 generally include any plastic component, part or feature of a disc drive that is secured either directly to the base plate or indirectly through another over-molded structural component to the base plate. Thus, it should be understood that the over-molded structural components shown in FIGS. 3 and 4 are exemplary for illustrative purposes only and that other over-molded components capable of being fastened to the base plate are within the scope of the present invention.

Over-molding disc drive structural components 104 and 105 to the platform portion 120 of the disc drive base plate 102 provides several advantages over die-cast or extruded base plates. These advantages include: (1) the elimination of fasteners and manufacturing stations required to install discrete pre-fabricated disc drive components to the die-cast or extruded base plate; (2) the elimination of purchasing and inventorying the discrete pre-fabricated disc drive components required for a die-cast or extruded base plates; (3) the elimination of tight tolerance positioning and sizing of the platform portion; (4) the elimination of tight tolerance positioning and sizing of the discrete pre-fabricated components of the disc drive; (5) the elimination of having to die cast/extrude the platform portion of the base plate with mounting rails for mounting the base plate to the computer chassis or spaced rails for mounting the PC board to the bottom of the base plate; (6) the elimination of the need for much of the manufacturing space required for the assembly of the components onto the die-cast or extruded base plates; and (7) the elimination of post machining operations required in the use of die-cast or extruded base plates.

Figure 5:
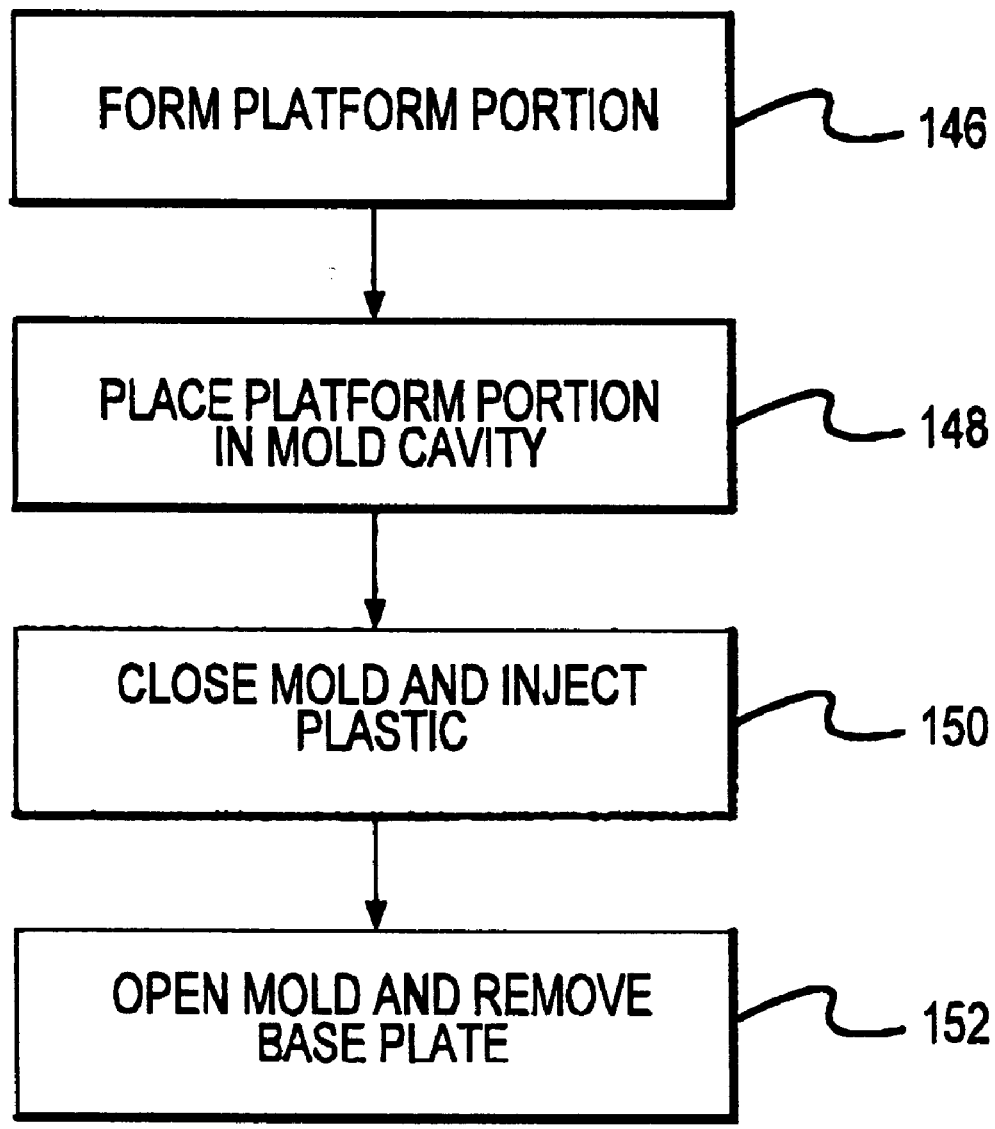
FIG. 5 is a flow chart of a method of manufacturing a low cost base plate having over-molded components in accordance with a preferred embodiment of the present invention.

A method for manufacturing a base plate 102 in accordance with the preferred embodiment of the present invention by over-molding the disc drive structural components 104 and 105 onto a platform portion 120 is shown in FIG. 5. In step 146, a platform portion 120 of the base plate 102 is formed by processes such as stamping or fine blanking. In step 148, the platform portion thus formed is placed in a mold cavity having recesses for one or more over-molded structural component on the base plate. In step 150, the mold is closed and a polymer is injected into the recesses to form over-molded structural components 104 and 105 on the platform portion. Finally, in step 152, the mold is opened and the completed base plate having over-molded structural components 104 and 105 fastened to it is removed.

In summary, the present invention is a low cost base plate (such as 102) for a disc drive (such as 100). The low cost base plate includes a platform portion (such as 120) having a top surface (such as 122) and a bottom surface (such as 124). A disc drive structural component (such as 104 and 105) is over-molded onto the platform portion (such as 120) to secure the structural component (such as 104 and 105) to the platform portion (such as 120). The structural component (such as 104 and 105) may be formed from a polymeric material. One example of a structural component (such as 104 and 105) is a spaced support rail (such as 144).

Two or more disc drive structural components (such as 104 and 105) may be over-molded to the platform portion (such as 120) of the base plate (such as 102), where one or more of the structural components (such as 104) may be over-molded to the top surface (such as 122) of the platform portion (such as 120) and one or more of the structural components (such as 105) may be over-molded to the bottom surface (such as 124) of the platform portion (such as 120).

The top surface (such as 122) of the platform portion (such as 120) may define a centrally located depression (such as 126) for receiving over-molded structural components (such as 104) of the disc drive (such as 100). The centrally located depression (such as 126) may also include a first aperture (such as 128) for mounting the spin motor (such as 108) and a second aperture for mounting an actuator assembly (such as 112). The structural components (such as 104) may be positioned within the centrally located depression (such as 126) or may be located on the bottom surface (such as 124) of the platform portion (such as 120).

The present invention is also a method for manufacturing a base plate (such as 102) for a disc drive (such as 100), where a platform portion (such as 120) is formed and a structural component (such as 104 and 105) is over-molded to the platform portion (such as 120) so as to fasten the structural component (such as 104 and 105) to the platform portion. The platform portion (such as 120) may be formed from sheet metal by stamping or fine blanking.

The method for manufacturing a base plate for a disc drive may further include over-molding two or more disc drive structural components (such as 104 and 105) to the platform portion (such as 120) of the base plate (such as 102). These structural components (such as 104 and 105) may be over-molded to the top or bottom surface (such as 122 and 124 respectively) of the platform portion.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art For example, other over-molded structural components not disclosed in the detailed specification are also envisioned to be within the scope of the present invention, these over-molded components may include but are not limited to: filter brackets, locating features, sound attenuation devices, shock protection features and flexible circuit routing structures. Accordingly, all such modifications, changes and alternatives are encompassed in the spirit of the invention disclosed and as defined in the appended claims.

What is claimed is:

1. A base plate for a disc drive, the base plate comprising:
    a metal platform portion having a top surface and a bottom surface; and
    a plastic disc drive structural component over-molded onto the metal platform portion to secure the plastic structural component to the metal platform portion wherein the top surface of the metal platform portion includes a centrally located depression for mounting a spin motor, and wherein the plastic disc drive structural component is positioned within the centrally located depression and defines separate structural components secured to both the top surface and the bottom surface of the metal platform portion.

2. The disc drive base plate of claim 1, wherein the plastic over-molded disc drive structural component includes a crash stop for limiting movement of a rotatable actuator assembly attached to the top surface of the metal platform portion.

3. The disc drive base plate of claim 1, wherein the plastic over-molded disc drive structural component includes a mounting boss having a threaded opening for fastening a circuit board to the bottom surface of the metal platform portion.

4. The disc drive base plate of claim 1, wherein the plastic disc drive structural component surrounds a circumference of the aperture on both the top and bottom surfaces of the metal platform portion.

5. The disc drive base plate of claim 4, wherein the plastic disc drive structural component covers an inner cylindrical surface defined by the aperture.

* * * * *

UNITED STATES PATENT AND TRADEMARK OFFICE
CERTIFICATE OF CORRECTION

PATENT NO.    : 6,426,847 B1
DATED         : July 30, 2002
INVENTOR(S)   : Dague et al.

It is certified that error appears in the above-identified patent and that said Letters Patent is hereby corrected as shown below:

Column 3,
Line 64, after "mechanism" insert -- for --.

Column 6,
Lines 5 through 17, amend claim 1 to read as follows:

-- 1. A base plate for a disc drive, the base plate comprising:
    a metal platform portion having a top surface and a bottom surface; and
    a plastic disc drive structural component over-molded onto the metal platform portion to secure the plastic structural component to the metal platform portion wherein the top surface of the metal platform portion includes a centrally located depression for mounting a spin motor and wherein the centrally located depression defines an aperture for mounting the spin motor, and wherein the plastic disc drive structural component is positioned within the centrally located depression, and wherein the plastic disc drive structural component extends through the aperture and defines separate structural components secured to both the top surface and the bottom surface of the metal platform portion. --

Signed and Sealed this

Twenty-fifth Day of March, 2003

JAMES E. ROGAN
*Director of the United States Patent and Trademark Office*